(12) United States Patent
Krupa et al.

(10) Patent No.: US 7,671,105 B2
(45) Date of Patent: Mar. 2, 2010

(54) RESIN COMPOSITION AND AN ARTICLE FORMED THEREFROM

(75) Inventors: Michael J. Krupa, South Rockwood, MI (US); Richard P. Harrison, Lincoln Park, MI (US); Edward A. Sliwka, Wyandotte, MI (US)

(73) Assignee: BASF Corporation, Florham Park, NJ (US)

( * ) Notice: Subject to any disclaimer, the term of this patent is extended or adjusted under 35 U.S.C. 154(b) by 560 days.

(21) Appl. No.: 11/466,135

(22) Filed: Aug. 22, 2006

(65) Prior Publication Data

US 2008/0051481 A1    Feb. 28, 2008

(51) Int. Cl.
C08G 18/48 (2006.01)
C08G 18/00 (2006.01)
C08J 9/00 (2006.01)

(52) U.S. Cl. .......................... 521/131; 521/50; 521/171
(58) Field of Classification Search ................. 521/131
See application file for complete search history.

(56) References Cited

U.S. PATENT DOCUMENTS

| | | | |
|---|---|---|---|
| 3,682,988 A | 8/1972 | Lewis | |
| 4,052,345 A * | 10/1977 | Austin et al. ................ | 521/129 |
| 4,094,869 A | 6/1978 | Biranowski et al. | |
| 4,686,241 A | 8/1987 | Pawloski et al. | |
| 4,690,954 A | 9/1987 | Wampfler et al. | |
| 4,734,443 A | 3/1988 | Pawloski et al. | |
| 4,851,559 A | 7/1989 | Pawloski et al. | |
| 4,945,118 A | 7/1990 | Pawloski et al. | |
| 4,970,018 A | 11/1990 | Lunney | |
| 5,100,922 A | 3/1992 | Wada et al. | |
| 5,260,347 A | 11/1993 | Krueger et al. | |
| 5,385,952 A | 1/1995 | Fishback et al. | |
| 5,420,167 A | 5/1995 | Fishback et al. | |
| 5,461,084 A | 10/1995 | Doerge | |
| 5,556,894 A | 9/1996 | Fishback et al. | |
| 5,567,763 A | 10/1996 | Madan et al. | |
| 5,840,781 A | 11/1998 | Dietrich et al. | |
| 6,034,197 A * | 3/2000 | Mahon et al. ................ | 521/174 |
| 6,107,359 A | 8/2000 | Dietrich et al. | |
| 6,211,257 B1 * | 4/2001 | Kaplan et al. ................ | 521/125 |
| 6,218,443 B1 | 4/2001 | Valoppi et al. | |
| 6,319,962 B1 | 11/2001 | Singh et al. | |
| 6,348,161 B1 | 2/2002 | White, III et al. | |
| 6,372,811 B2 | 4/2002 | Singh et al. | |
| 6,476,091 B2 | 11/2002 | White, III et al. | |
| 6,653,361 B2 | 11/2003 | Gilman et al. | |
| 6,995,203 B2 | 2/2006 | Ryang et al. | |
| 2001/0014387 A1 * | 8/2001 | Giampaolo ............... | 428/314.4 |
| 2004/0082465 A1 * | 4/2004 | Kiso et al. .................. | 502/167 |
| 2004/0173783 A1 * | 9/2004 | Curzon et al. ............... | 252/602 |
| 2005/0070665 A1 * | 3/2005 | Ludlow, III ................. | 525/131 |
| 2006/0148921 A1 * | 7/2006 | Stanjek et al. .............. | 521/154 |

FOREIGN PATENT DOCUMENTS

| | | | | |
|---|---|---|---|---|
| WO | WO 03/099914 A1 | | 12/2003 | |
| WO | WO 2004/026948 | * | 4/2004 | |
| WO | WO2004/026948 A2 | * | 4/2004 | ............. 428/319.1 |
| WO | WO 2007/005650 | * | 1/2007 | |

* cited by examiner

*Primary Examiner*—Randy Gulakowski
*Assistant Examiner*—Kara Negrelli
(74) *Attorney, Agent, or Firm*—Howard & Howard Attorneys PLLC

(57) ABSTRACT

A resin composition and an article formed therefrom are disclosed. The resin composition comprises a halogenated polyol, a brominated polyol different from the halogenated polyol, and a flame retardant. The resin composition may further comprise other components, such as supplemental polyols, catalysts, adhesion promoters, surfactants, blowing agents, additives, or combinations thereof. The article comprises the reaction product of an isocyanate, the halogenated polyol, and the brominated polyol in the presence of the flame retardant, a blowing agent, and optionally, one or more of the other components. Typically, the article is defined as a polyurethane foam. The article exceeds Class I flammability requirements, such as flame spread index, smoke density, and convective flame spread parameter according to ASTM E-84 and FM 4880 testing. In addition, the article exhibits excellent dimensional stability and adhesion strength, and may be used to form building materials, such as insulation, wall, and ceiling panels.

36 Claims, No Drawings

RESIN COMPOSITION AND AN ARTICLE FORMED THEREFROM

FIELD OF THE INVENTION

The present invention generally relates to a resin composition and an article formed therefrom. More specifically, the present invention relates to an article that exhibits excellent dimensional stability and adhesion strength while exceeding Class I flammability requirements for building materials due to a resin composition that is used to form the article.

DESCRIPTION OF THE RELATED ART

Surface burning characteristics of materials are determined by test methods such as the American Society of Testing Materials (ASTM) E-84 "Standard Test Method for Surface Burning Characteristics of Building Materials." The ASTM E-84 test is used to assess spread of a flame on a surface of the material, typically, a building material. The ASTM E-84 test exposes the material, i.e., an article such as polyurethane (PUR) or polyisocyanurate (PIR) foam, to a controlled air flow and a flaming fire exposure, adjusted so as to spread the flame along an entire length of the foam. Typically, the test is performed on core foam of chosen thickness but on occasion it is performed on faced products, such as foil laminated board stock. A flame spread index and a smoke density are the two parameters measured in the ASTM E-84 test. The flame spread index takes into account both the rate and total distance of the propagation of a flame front, measured visually. The smoke density is a time-integrated measurement of the occlusion of a visible beam of light.

Performance of the foam is put into categories. Namely, a 0-25 flame spread index is designated Class I, a 26-75 flame spread index is designated Class II, and a 76-225 flame spread index is designated Class III. A smoke density limit of 450 is required in each of these classes. Another flammability test is FM 4880. In order to meet Class I flammability requirements, a convective flame parameter ($FSP_c$) of the FM 4880 test must be equal to or less than $0.39\ s^{-1/2}$. The $FSP_c$ is determined from the chemical heat of combustion, effective heat of gasification, net heat flux, and thermal response parameter of the foam.

Since the foams may be used in building construction, the foams must adhere to local building code requirements for flammability. When regulating building materials, many of the model building codes and insurance rating organizations refer to quality standards developed by standards-setting organizations such as the ASTM. Generally, the codes require that the foams have a flame spread index of 75 or less and a smoke density of 450 or less, i.e., meet Class II rating in accordance with the ASTM E-84 test.

Foams used in laminated board stocks for building insulation applications have typically exceeded this requirement and have historically been rated as Class I in the ASTM E-84 test. Foams and methods for forming laminated board stock including the foams are disclosed, for example, in U.S. Pat. Nos. 5,385,952 to Fishback et al. (the '952 patent), U.S. Pat. No. 6,319,962 to Singh et al. (the '962 patent), and U.S. Pat. No. 6,372,811 to Singh et al. (the '811 patent). However, the foams of the above patents rely on a high isocyanate index in order to meet Class I flammability requirements. The above patents disclose broad ranges of an isocyanate index; however, example sections of the above patents only teach higher isocyanate indexes, i.e., isocyanate indexes of 200 or more, and do not specifically teach with respect to lower isocyanate indexes, i.e., isocyanate indexes below 200. For example, the isocyanate index of the foams in an example section of the '952 patent are at lowest 200 and reach upwards of 350. At this range of isocyanate index, the foams of the '952 patent are PIR foams rather than PUR foams. As is known in the art, PIR foams intrinsically have an improved flammability performance and reduced smoke density, but tend to be friable and thus have poor adhesion when compared to PUR foams. The foams of the '962 patent also suffer from many of the weaknesses of the foams of the '952 patent, namely higher isocyanate indexes in an example section of the '962 patent, ranging of from 275 to 325, which are again PIR foams. The '811 patent also fails to specifically teach lower isocyanate indexes in an example section, as like the '952 and '962 patents. The foams of the '811 patent also rely heavily on a physical blowing agent in order to meet Class I flammability requirements, as is shown in the example section of the '811 patent. In addition, as also shown in the example section, gel times for the foams of the '811 patent are very low, at around 20 seconds. The foams of the above patents are useful for making laminated board stocks, such as continuously laminated board stocks, as shown and described in the patents, however, all of the foams tend to gel too quickly, and are generally not useful for large scale molding operations, such as those employed during production of long and/or thick insulation, wall, and ceiling panels.

Due to the fast gel times, the foams of the above patents will cure prior to fully rising, filling and expanding within a large mold or similar reaction vessel. In addition, the foams of the above patents rely heavily on physical blowing agents and a phosphorous containing flame retardant in order to meet Class I flammability requirements. As such, the foams of the above patents are limited in their formulation, as they require minimum amounts of the physical blowing agent and the flame retardant in order to meet Class I flammability requirements. In addition, the above patents do not specifically teach or disclose use of brominated polyols in order to exceed Class I flammability requirements.

Accordingly, there remains an opportunity to further improve physical and flammability properties of foams, in addition to increasing flexibility in both formulation and manufacturing requirements of foams over those previously achieved.

SUMMARY OF THE INVENTION AND ADVANTAGES

The present invention provides a resin composition and an article formed therefrom. The resin composition comprises a halogenated polyol, a brominated polyol different from the halogenated polyol, and a flame retardant. The article comprises the reaction product of an isocyanate, the halogenated polyol, and the brominated polyol in the presence of a flame retardant and a blowing agent.

Due to the presence of the halogenated polyol, the brominated polyol, and the flame retardant, the article exceeds Class I flammability requirements by not surpassing a maximum flame spread index, smoke density, and convective flame spread parameter of ASTM E-84 and FM 4880 flammability tests, respectively. In addition, the article exhibits excellent dimensional stability and adhesion strength not previously attainable with previous articles that met Class I flammability requirements. The article also has increased flexibility in both formulation and manufacturing requirements. For example, the article of the present invention may have broad ranges of components allowing for less stringent manufacturing requirements, and may be used to form a wide variety of different products.

DETAILED DESCRIPTION OF THE INVENTION

A resin composition is provided for use in forming an article. The resin composition comprises a halogenated polyol, a brominated polyol different from the halogenated polyol, and a flame retardant. The article comprises the reaction product of an isocyanate, the halogenated polyol, and the brominated polyol, in the presence of the flame retardant and a blowing agent. Typically, the article is further defined as a polyurethane (PUR) foam, which will be discussed in further detail below. The article may be used to form building materials such as, but not limited to, insulation, wall, and ceiling panels.

The resin composition includes the brominated polyol. The brominated polyol may be any suitable brominated polyol as is known in the art. For example, the brominated polyol may fall into the class of polyester polyols, a polyether polyols, and combinations thereof. As another example, the brominated polyol may be an aliphatic polyol, a cycloaliphatic polyol, an aromatic polyol, a heterocyclic polyol, and combinations thereof. In one embodiment, the brominated polyol is selected from the group of brominated diols, brominated triols, and combinations thereof. It is to be appreciated that the term "brominated" means comprising one or more bromine atoms. The brominated polyol may comprise other halogen atoms in addition to bromine atoms. In one embodiment, the brominated polyol is tetrabrominated, i.e., comprises four bromine atoms. However, it is to be appreciated that the brominated polyol may comprise more or less than four bromine atoms. One specific example of a suitable brominated polyol is a tetrabromophalate diol, commercially available from Great Lakes Chemical Corporation of West Lafayette, Ind. under the trade name PHT4-Diol™. Another specific example of a suitable brominated polyol is Firemaster® 520, which is also commercially available from Great Lakes Chemical Corporation.

Typically, the brominated polyol has a nominal functionality of from 2 to 3, more preferably of from 2 to 2.5, and most preferably of about 2. Typically, the brominated polyol has an OH value of from 100 to 800, more preferably of from 200 to 700, and most preferably of from 300 to 600 mg KOH/g. Without being bound or limited by any particular theory, it is believed that increasing the number of bromine atoms of the brominated polyol allows the article to have excellent flammability resistance and test results. For example, the brominated polyol may have a bromine atom content of about 46 percent by weight of the brominated polyol. In addition, the brominated polyol seems to benefit the article, specifically with regard to flammability properties of the article, when in the presence of the halogenated polyol and the flame retardant.

Typically, the brominated polyol is included in an amount of from 5 to 35, more preferably of from 5 to 25, and most preferably of from 5 to 15 percent by weight of the resin composition. It is to be appreciated that the amounts shown above are based on the percent by weight of the resin composition only as a reference point, and should not be construed as limiting the brominated polyol to only within the resin composition. For example, the brominated polyol may be included with the resin composition, added during the formation of the article, or combinations thereof.

The resin composition further includes the halogenated polyol. The halogenated polyol may be any suitable halogenated polyol as is known in the art. For example, the halogenated polyol may comprise a polyester polyol, a polyether polyol, or combinations thereof. As another example, the halogenated polyol may comprise an aliphatic polyol, a cycloaliphatic polyol, an aromatic polyol, a heterocyclic polyol, or combination thereof. In one embodiment, the halogenated polyol may be based on dimethyl terephthalate (DMT). In another embodiment, the halogenated polyol comprises an aromatic polyester polyol. One specific example of a suitable halogenated polyol is an aromatic polyester polyol, commercially available from Oxid, Incorporated of Houston, Tex. under the trade name Terol® 925.

Typically, the halogenated polyol has a nominal functionality of less than 3, more preferably of from 2 to 2.5, and most preferably of about 2.5. Typically, the halogenated polyol has an OH value of from 100 to 800, most preferably of from 250 to 350. It is to be appreciated that the term "halogenated" means comprising one or more of a substituent comprising a halogen atom. When the halogenated polyol includes one or more of the substituents, the substituents may all be the same or may be different from one another. The substituent may be any halogen atom, such as a fluorine atom, a chlorine atom, a bromine atom, an iodine atom, or an astatine atom. Typically, the halogenated polyol comprises one or more substituents selected from the group of a chlorine atom, a bromine atom, and combinations thereof. Without being bound or limited by any particular theory, it is believed that increasing the number of the substituents of the halogenated polyol allows the article to have excellent flammability resistance and test results. In addition, the halogenated polyol seems to benefit the article, specifically with regard to flammability properties of the article, when in the presence of the brominated polyol and the flame retardant.

Typically, the halogenated polyol is included in an amount of from 20 to 85, more preferably of from 35 to 70, and most preferably of from 35 to 45 percent by weight of the resin composition. It is to be appreciated that the amounts shown above are based on the percent by weight of the resin composition only as a reference point, and should not be construed as limiting the halogenated polyol to only within the resin composition. For example, the halogenated polyol may be included with the resin composition, added during the formation of the article, or combinations thereof.

The resin composition may further comprise a supplemental polyol different from the halogenated and brominated polyols. The supplemental polyol may be any suitable polyol as is known in the art. For example, the supplemental polyol may comprise a polyester polyol, a polyether polyol, or combinations thereof. As another example, the supplemental polyol may comprise an aliphatic polyol, a cycloaliphatic polyol, an aromatic polyol, a heterocyclic polyol, or combinations thereof. As yet another example, the supplemental polyol may comprise a sucrose polyol, a sucrose/glycerine polyol, a trimethylolpropane polyol, or combinations thereof.

The supplemental polyol may have a nominal functionality of from 2-8. Typically, the supplemental polyol has a nominal functionality of from 4 to 6. A higher nominal functionality, i.e., 4 or more, may be useful for increasing a crosslink density of the article and therefore provide excellent dimensional stability for the article. In addition, the supplemental polyol may also be useful for decreasing demolding time of the article. Typically, the supplemental polyol has an OH value of from 100 to 800, more preferably of from 200 to 600, and most preferably of from 360 to 570 mg KOH/g.

In one embodiment, the supplemental polyol comprises a first polyol and a second polyol, which is especially useful when two different polyols are required such as, but not limited to, two polyols with different nominal functionalities. For example, the first polyol may have a nominal functionality of about 4. A specific example of a suitable first polyol is a sucrose/glycerine polyol, commercially available from BASF Corporation of Wyandotte, Mich. under the trade name Pluracol® PEP 450. As another example, the second polyol may have a nominal functionality of about 5.5. A specific example of a suitable second polyol is a polyether tetrol, which is also commercially available from BASF Corporation, under the trade name Pluracol® SG-470. In one embodiment, the supplemental polyol is a polyether polyol, which is useful for lowering a viscosity of the resin composition and thereby promotes increased flowability of the resin composition.

Typically, the supplemental polyol is included in an amount of from 2 to 25 percent by weight of the resin composition. When the supplemental polyol comprises the first and second polyols, typically, the first polyol is included in an amount of from 2 to 10, more preferably of from 3 to 5, and most preferably of from 3.5 to 4.5 percent by weight of the resin composition. In addition, typically, the second polyol is included in an amount of from 10 to 30, more preferably of from 12.5 to 20, and most preferably of from 14.5 to 20 percent by weight of the resin composition. It is to be appreciated that the amounts shown above are based on the percent by weight of the resin composition only as a reference point, and should not be construed as limiting the supplemental polyol or, the first or second polyols, to only within the resin composition. For example, the supplemental polyol may be included with the resin composition, added during the formation of the article, or combinations thereof.

The resin composition further includes the flame retardant. The flame retardant may be any suitable flame retardant as is known in the art. Typically, the flame retardant comprises one or more phosphorus atoms and may be selected from the group of phosphates, phosphites, phosphonates, polyphosphates, polyphosphites, ammonium polyphosphates, and combinations thereof. Without being bound or limited by any particular theory, it is believed that the flame retardant, when comprising phosphorous atoms, seems to benefit the article, specifically with regard to flammability resistance and test results of the article, when in the presence of the brominated polyol and the halogenated polyol.

Typically, the flame retardant is included in an amount of from 5 to 35, more preferably of from 5 to 25, and most preferably of from 5 to 15 percent by weight of the resin composition. It is to be appreciated that the amounts shown above are based on the percent by weight of the resin composition only as a reference point, and should not be construed as limiting the flame retardant to only within the resin composition. For example, the flame retardant may be included with the resin composition, included with the isocyanate, added during the formation of the article, or combinations thereof.

Suitable phosphates may be of the following formula:

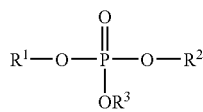

where $R^1$ to $R^3$ signifies alkyl, halogen substituted alkyl, aryl, halogen substituted aryl and cycloalkyl groups. Preferred phosphates are those where $R^1$ to $R^3$ signifies $C_1$-$C_{12}$ alkyl, $C_1$-$C_{12}$ halogen substituted alkyl, phenyl, cresyl, halogen substituted phenyl and $C_5$-$C_{10}$ cycloalkyl groups. More preferred phosphates are those where $R^1$ to $R^3$ signifies $C_1$-$C_8$ alkyl, $C_1$-$C_8$ halogen substituted alkyl, and phenyl groups. Most preferred phosphates are those where R1 to R3 signifies $C_1$-$C_4$ alkyl, $C_1$-$C_4$ halogen substituted alkyl, and phenyl groups. Some examples of suitable phosphates are tributyl phosphate, tris(2-chloroethyl) phosphate (TCEP), commercially available from Aceto Corporation of Lake Success, N.Y., tris(1,3-dichloro-2-propyl)phosphate (TCPP), which is also commercially available from Aceto Corporation, tris(2-chloropropyl) phosphate, commercially available from Albemarle Corporation of Baton Rouge, La. under the trade name AB80, tris(2-chloroisopropyl) phosphate, which is commercially available from Akzo Nobel Functional Chemicals LLC of Dobbs Ferry, N.Y. under the trade name Fyrol® PCF, tetrakis(2-chloroethyl)ethylene diphosphate, t-butylphenyl diphenylphosphate, which is also commercially available from Akzo Nobel Functional Chemicals LLC under the trade name Phosflex® 71B, triethyl phosphate (TEP), which is commercially available from Eastman Chemical Company, tributyl phosphate, commercially available from Akzo Nobel under the trade name Phosflex® 4, chloropropyl bis(bromopropyl) phosphate, commercially available from Great Lakes Corporation under the trade name Firemaster® FM836, and Firemaster® 550 and Firemaster® BZ-54, both of which are also commercially available from Great Lakes Corporation.

Suitable phosphites may be of the following formula:

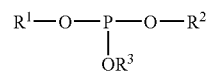

where $R^1$ to $R^3$ signifies H, alkyl, halogen substituted alkyl, aryl, halogen substituted aryl and cycloalkyl groups. Preferred phosphites are those where $R^1$ to $R^3$ signifies $C_1$-$C_{12}$ alkyl, $C_1$-$C_{12}$ halogen substituted alkyl, phenyl, cresyl, halogen substituted phenyl and $C_5$-$C_{10}$ cycloalkyl groups. More preferred phosphites are those where $R^1$ to $R^3$ signifies, $C_1$-$C_8$ alkyl, $C_1$-$C_8$ halogen substituted alkyl, and phenyl groups. Most preferred phosphites are those where $R^1$ to $R^3$ signifies $C_1$-$C_4$, alkyl, $C_1$-$C_4$, halogen substituted alkyl, and phenyl groups. Some examples of suitable phosphates are triethyl phosphite (TEP), tris(2-chloroethyl)-phosphite, and triphenyl phosphite (TPP).

Suitable phosphonates may be of the following formula:

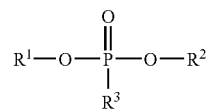

where $R^1$ to $R^3$ signifies alkyl, halogen substituted alkyl, aryl, halogen substituted aryl and cycloalkyl groups. Preferred phosphonates are those where $R^1$ to $R^3$ signifies $C_1$-$C_{12}$ alkyl, $C_1$-$C_{12}$ halogen substituted alkyl, phenyl, cresyl, halogen substituted phenyl and $C_5$-$C_{10}$ cycloalkyl groups. More preferred phosphonates are those where $R^1$ to $R^3$ signifies $C_1$-$C_8$ alkyl, $C_1$-$C_8$ halogen substituted alkyl, and phenyl groups. Most preferred phosphonates are those where $R^1$ to $R^3$ signifies $C_1$-$C_4$ alkyl, $C_1$-$C_4$ halogen substituted alkyl, and phenyl groups. Some examples of suitable phosphonates are diethyl ethyl phosphonate, dimethyl methyl phosphanate, dimethyl methane phosphonate, diethyl diethanoaminomethylphosphonate, bis(2-chloroethyl), and 2-chloroethyl phosphonate. An example of a suitable ammonium polyphosphate $[(NH_4PO_3)_n; n=\text{about } 1000]$ is Hostaflam AP 422, commercially available from Hoechst AG of Frankfurt, Germany.

The flame retardant may have one or more isocyanate-reactive hydrogen atoms comprising a hydroxyl group, amino group, thio group, and combinations thereof. Suitable compounds may include monomeric or oligomeric phosphates, phosphites, phosphonates polyols, and combinations thereof.

Suitable isocyanate-reactive phosphates may be prepared by (1) a reaction of polyalkylene oxides with phosphoric acids and partial esters of phosphoric acids, (2) a reaction of aliphatic alcohols with phosphoric acids and partial esters of phosphoric acids, and (3) by transesterification of products of (1) and (2). Examples of suitable isocyanate-reactive phosphates include tributoxyethyl phosphates, oligomeric organophosphate diols, ethoxylated phosphate esters, mono- and diesters of phosphoric acid and alcohols, and combinations thereof.

Suitable isocyanate-reactive phosphites may be prepared by (1) a reaction of polyalkylene oxides with phosphorous acids and partial esters of phosphorous acids, (2) a reaction of aliphatic alcohols with phosphorous acids and partial esters of phosphorous acids, and (3) by transesterification of products of (1) and (2).

Suitable isocyanate-reactive phosphonates may be prepared (1) by a reaction of polyalkylene oxides with phosphonic acids, (2) by a reaction of phosphite polyols with alkyl halides, (3) by a condensation of dialkyl phosphonates, diethanolamine and formaldehyde, (4) by transesterification of products of (1) (2) and (3), and (5) by reaction of dialkyl alkyl phosphonate with phosphorous pentaoxide and alkylene oxide. Some examples of suitable isocyanate-reactive phosphonates include diethyl N,N-bis(2-hydroxyethyl) aminoethyl phosphonate, hydroxyl containing oligomeric phosphonate. Other examples of suitable flame retardants include red phosphorous, hydrated aluminum oxide, calcium sulfate, expanded graphite, cyanuric acid derivatives, and combinations thereof.

The isocyanate may be any suitable isocyanate as is known in the art. Examples of suitable isocyanates for forming the article include organic polyisocyanates, which may have two or more isocyanate functionalities, and include conventional aliphatic, cycloaliphatic, araliphatic and aromatic isocyanates. Specific examples of suitable isocyanates include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. Other examples of suitable isocyanates include Lupranate® M70L, Lupranate® M70R, and Lupranate® M20S, and combinations thereof, which are all commercially available from BASF Corporation.

Frequently, the isocyanate may include modified multivalent isocyanates, i.e., products obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of 15 to 33.6 parts by weight based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the isocyanate and produced from the polyester polyols and/or polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of from 15 to 33.6 parts by weight based on the total weight of the isocyanate, may also be suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The isocyanate used in the subject invention may have a nominal functionality of at least 2. Typically, the isocyanate has a nominal functionality of at least 2.7. A higher nominal functionality, e.g., 2.7, provides for a greater cross-linking density in the article compared to a lower nominal functionality, e.g., 2, which improves the dimensional stability of the article.

The isocyanate, the halogenated polyol, the brominated polyol, and optionally, one of the supplemental polyols different from the halogenated and brominated polyols, may be reacted at any isocyanate index. Typically, the isocyanate index is of from 90 to 150, more preferably of from 100 to 120, and most preferably of from 105 to 115. In one embodiment, the isocyanate and the resin composition may be over indexed, i.e., a stoichiometric excess of the isocyanate to all isocyanate-reactive components, i.e., the halogenated and brominated polyols, and optionally, one or more of the supplemental polyols different from the halogenated and brominated polyols, in the resin composition may be provided in order to maximize dimensional stability of the article. More specifically, the isocyanate and the resin composition may be reacted at an isocyanate index of at least 105. For example, the isocyanate index may fall within a range of from 105 to 130 to yield excellent dimensional stability within the article. The dimensional stability prevents the article from pulling away from a substrate, such as metal, and also prevents the article from losing insulating properties. Typically, a PUR foam is made with isocyanate indexes in the range of from 90 to 150, and a polyisocyanurate (PIR) foam is made with isocyanate indexes in the range of from 200 to 350. However, PIR foams tend to be friable and thus have poor adhesion for attachment to a substrate and thus are not suitable for purposes of the present invention.

When over indexing is employed, the article may be formed in the presence of a trimerization catalyst. The trimerization catalyst may be any suitable trimerization catalyst as is known in the art. Typically, the trimerization catalyst is included in an amount of from 0.1 to 1.0, more preferably of from 0.2 to 0.8, and most preferably of from 0.3 to 0.5 percent by weight of the resin composition. It is to be appreciated that the amounts shown above are based on the percent by weight of the resin composition only as a reference point, and should not be construed as limiting the trimerization catalyst to only within the resin composition. For example, the trimerization catalyst may be included with the resin composition, included with the isocyanate, added during the formation of the article, or combinations thereof. Some examples of suitable trimerization catalysts include N,N,N-dimethylaminopropyl-hexahydrotriazine, potassium, potassium acetate, N,N,N-trimethyl isopropyl amine/formate, and combinations thereof. One specific example of a suitable trimerization catalyst is Polycat® 41, commercially available from Air Products and Chemicals of Allentown, Pa. The trimerization catalyst may be used to aid in curing excess isocyanate after the isocyanate, the halogenated and brominated polyols, and optionally, one or more of the supplemental polyols different from the halogenated and brominated polyols, react. Curing of excess isocyanate may result in excellent dimensional stability of the article. In addition, the trimerization catalyst may also be used to aid in the article further exceeding flammability requirements.

The article may be formed in the presence of a tertiary amine catalyst. The tertiary amine catalyst may be any suitable tertiary amine catalyst as is known in the art. Typically, the tertiary amine catalyst is included in an amount of from 0.1 to 1.0, more preferably of from 0.3 to 0.8, and most preferably of from 0.5 to 0.7 percent by weight of the resin composition. It is to be appreciated that the amounts shown above are based on the percent by weight of the resin composition only as a reference point, and should not be construed as limiting the tertiary amine catalyst to only within the resin composition. For example, the tertiary amine catalyst may be included with the resin composition, included with the isocyanate, added during the formation of the article, or combinations thereof. Some examples of suitable tertiary amine catalysts include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino)propylimidazole, and combinations thereof. Some specific examples of suitable tertiary amine catalysts are Polycat® 18 and Polycat® 1058, which are both commercially available from Air Products and Chemicals. The tertiary amine catalyst may be used to aid in demolding, i.e., removing, the article from a mold or other reaction vessel if employed during formation of the article.

The article may be formed in the presence of an amine blowing catalyst. The amine blowing catalyst may be any suitable amine blowing catalyst as is known in the art. Typically, the amine blowing catalyst is included in an amount of from 0.1 to 1.0, more preferably of from 0.3 to 0.8, and most preferably of from 0.5 to 0.7 percent by weight of the resin composition. It is to be appreciated that the amounts shown above are based on the percent by weight of the resin composition only as a reference point, and should not be construed as limiting the amine blowing catalyst to only within the resin composition. For example, the amine blowing catalyst may be included with the resin composition, included with the isocyanate, added during the formation of the article, or combinations thereof. A specific example of a suitable amine blowing catalyst is N,N-dimorpholinodiethyl ether, commercially available from Chevron Products Company of San Ramon, Calif. under the trade name Texacat® DMDEE. The amine blowing catalyst may be used to increase the rate of reaction between the isocyanate, the halogenated and brominated polyols, and optionally, one or more of the supplemental polyols different from the brominated and halogenated polyols during formation of the article.

The resin composition may further include the blowing agent. The blowing agent may be any suitable blowing agent as is known in the art. In one embodiment, the blowing agent may be selected from the group of chemical blowing agents, physical blowing agents, and combination thereof. For example, the blowing agent may be selected from the group of hydrofluorocarbons, hydrocarbons, chlorofluorocarbons, hydrochloroflourocarbons, water, and combinations thereof.

The resin composition may further include a co-blowing agent in addition to the blowing agent. Typically, the blowing agent is a physical blowing agent such as, but not limited to, a hydrofluorocarbon, and the co-blowing agent is a chemical blowing agent such as, but not limited to, water. As used herein, the physical blowing agents are the blowing agents that retain their original chemical structure throughout a blowing process. Specific examples of the physical blowing agents that are suitable for the present invention include HFC-134a, HFC-152a, BFC-245fa, HFC-365mfc, HFC-22, and combinations thereof, as well as iso-butane, iso-pentane, cyclopentane, n-pentane, and combinations thereof. Typically, the physical blowing agent is selected from the group of hydrofluorocarbons, hydrocarbons, and combinations thereof, due to zero ozone depletion potential. In one embodiment, the physical blowing agent comprises HFC-245fa. As known to those skilled in the art, the chemical blowing agent, e.g., water, reacts with the isocyanate, thereby generating carbon dioxide during the formation of the article which actually carries out the blowing process.

Typically, the blowing agent, i.e., the chemical blowing agent is included in an amount of from 10 to 25, more preferably of from 10 to 20, and most preferably of from 10 to 15 percent by weight of the resin composition. When included, typically, the co-blowing agent, i.e., water is included in an amount of from 1.0 to 5.0, more preferably included of from 2.0 to 4.0, and most preferably of from 2.0 to 3.0 percent by weight of the resin composition. It is to be appreciated that the amounts shown above are based on the percent by weight of the resin composition only as a reference point, and should not be construed as limiting the blowing agent or the co-blowing agent to only within the resin composition. For example, the blowing agent may be included with the resin composition, included with the isocyanate, added during the formation of the article, or combinations thereof.

The resin composition may further include an adhesion promoter. The adhesion promoter may be any suitable adhesion promoter as is known in the art. In one embodiment, the adhesion promoter comprises propylene carbonate, which promotes excellent adhesion strength for the article, especially at lower molding temperatures, for example, at 90° F. A specific example of a suitable adhesion promoter is Jeffsol® Propylene Carbonate, commercially available from Huntsman Corporation if Salt Lake City, Utah. Other examples of suitable adhesion promoters include castor oil, polyethylenimine, polyester polyols derived from polycarboxilic acids, and combinations thereof.

Typically, the adhesion promoter is included in an amount of from 1.0 to 10, more preferably of from 2.0 to 8.0, and most preferably of from 4.0 to 6.0 percent by weight of the resin composition. It is to be appreciated that the amounts shown above are based on the percent by weight of the resin composition only as a reference point, and should not be construed as limiting the adhesion promoter to only within the resin composition. For example, the adhesion promoter may be included with the resin composition, included with the isocyanate, added during the formation of the article, or combinations thereof. Without being bound or limited by any particular theory, it is believed that the adhesion promoter imparts surface instability to the article and causes cells on a surface of the article to collapse. When the article is adjacent to a substrate, such as metal, the collapse of the cells results in excellent bonding between the article and the substrate. As a result, the article and the substrate exhibit excellent adhesion strength between one another.

The resin composition may further include a surfactant. The surfactant may be any suitable surfactant as is known in the art. For example, the surfactant may be an inorganic surfactant, an organic surfactant, and combinations thereof. As another example, the surfactant may also be a non-ionic surfactant, a cationic surfactant, an anionic surfactant, an amphoteric surfactant, and combinations thereof. As yet another example, the surfactant may be a polyoxyalkylene polyol, an alkylphenol ehtoxylate, and combinations thereof. A specific example of a suitable surfactant is a silicone surfactant, commercially available from Goldschmidt Chemical Corporation of Hopewell, Va. under the trade name of TEGOSTAB® B 8408.

Typically, the surfactant is included in an amount of from 0.1 to 3, more preferably of from 1 to 2.5, and most preferably included of from 1.5 to 2.5 percent by weight of the resin composition. It is to be appreciated that the amounts shown above are based on the percent by weight of the resin composition only as a reference point, and should not be construed as limiting the surfactant to only within the resin composition. For example, the surfactant may be included with the resin composition, included with the isocyanate, added during the formation of the article, or combinations thereof.

The resin composition may further include an additive. The additive may be selected from the group of plasticizers, cross-linking agents, chain-extending agents, chain-terminating agents, air releasing agents, wetting agents, surface modifiers, waxes, foam stabilizing agents, viscosity reducers, infrared opacifiers, cell-size reducing compounds, reinforcing agents, dyes, pigments, colorants, mold release agents, antioxidants, compatibility agents, ultraviolet light stabilizers, thixotropic agents, anti-aging agents, lubricants, coupling agents, solvents, rheology promoters, fillers, combinations thereof, and other additives as are known to those skilled in the art. Typically, the additive is included in an amount of from 0.1 to 5 percent by weight of the resin composition. It is to be appreciated that the amounts shown above are based on the percent by weight of the resin composition only as a reference point, and should not be construed as limiting the additive to only within the resin composition. For example, the additive may be included with the resin composition, included with the isocyanate, added during the formation of the article, or combinations thereof.

As previously discussed, typically, the article is further defined as a PUR foam. For example, the article may be a rigid PUR foam. The article may be used in a wide variety of applications. Typically, the article is used to form building materials such as, but not limited to, insulation, wall and ceiling panels. The article may be disposed adjacent to, i.e., adhered to, a substrate, such as metal, plastic, wood, paper, combinations thereof, and other substrates as are known to those skilled in the art. The article may be formed by any method or means as in known to those skilled in the art. For example, the article may be formed in a reaction vessel such as, but not limited to, an open- or closed-type mold. As other examples, the article may be formed directly on the substrate, or adhered to the substrate after forming the article.

The article may have any density. Typically, the article has a density of from 1 to 5, more preferably of from 1 to 3, and most preferably of from 1.5 to 2.5 pounds per cubic foot. The article may be of any size and shape. For example, the article may have a thickness of from 1 to 12 inches. One skilled in the art will select an appropriate size and shape based on necessity, qualities, and desire.

Typically, the article has a gel time of from 25 to 200, more preferably of from 50 to 150, and most preferably of from 60 to 120 seconds. A longer gel time range allows the article to rise and expand, which is especially useful during production. This is especially useful for making insulation, wall, or ceiling panels in a mold, a panel, or other reaction vessel. For example, having a longer gel time allows the article to fully rise and expand within the mold prior to curing. As such, the article may rise to a height or thickness of from 6 inches or more. In addition, if the mold is large in size, the longer gel time allows the article to fully expand within the mold. For example, the mold may be about 40 feet in length, and the article may be mixed and communicated into the mold at one end. The longer gel time allows the article to fully expand to an opposite end of the mold prior to curing. Conversely, other previous articles of the prior art, which are used primarily to make continuous laminate board stocks, tend to have very fast gel times, typically less than 25 seconds. However, due to the fast gel time, the articles of the prior art cannot rise or expand to sufficient heights or lengths for large scale molding processes and thus are not suitable for purposes of the present invention. In addition, the articles of the prior art tend to be very friable, as previously described above, which greatly reduces adhesion strength when the articles of the prior art are bonded to the substrate, and thus are not suitable for purposes of the present invention. It is to be appreciated that the article of the present invention is not limited to large scale molding processes. It should also be appreciated that the article of the present invention is not limited to use with the substrate. For example, the article may be used alone. It should be appreciated that the term "gel time" is defined as is generally known in the art. Typically, the gel time is defined as a total time between initially mixing components for forming the article and a time when long strings, i.e., tacky material, can be pulled from an interior of the article while forming. For example, to test the gel time of the article, a stop watch is started when components of the article are initially mixed and after some time has passed, i.e., the article is foaming, a spatula is pushed into and then pulled from the article to observe whether any of the article is withdrawn along with the spatula. If any of the article "strings" along with the spatula while pulling the spatula away from the article, the total time passed since initially mixing the components is recorded as the gel time.

The article of the present invention has a flame spread index of less than or equal to 25 and a smoke density of less than or equal to 450 according to ASTM E-84 testing. The article also has a convective flame spread parameter (FSPC) of less than or equal to $0.39\ s^{-1/2}$ according to FM 4880 testing. When the flame spread index, the smoke density, and the convective flame spread parameter are met, i.e., the article is at or below these numbers, the article is classified as Class I for meeting Class I flammability requirements. Typically, the article must meet this criterion in order to be used to form building materials. These tests and flammability requirements are well known to those skilled in the art. The article of the present invention exceeds Class I flammability, as further discussed and shown below.

When there is the substrate, the article exhibits excellent adhesion strength between the article and the substrate. The article and the substrate may be exposed to various temperatures such as, but not limited to, temperatures encountered inside and/or outside of a building or similar structure. The article and the substrate remain adhered after many heating and cooling thermo-cycles and do not exhibit blistering or bubbling, i.e., the substrate does not de-bond from the article or vice versa. The article also exhibits excellent adhesion strength when exposed to various humidity levels such as, but not limited to, humidity levels encountered in tropical, arid, and temperate climates.

The article also has excellent dimensional stability. More specifically, dimensional stability is measured as a percent volume change of the article over a period of days at a given temperature and humidity. The article of the present invention may exhibit a percent volume change of less than 5 percent over a period of up to 28 days at a temperature of up to 200° F. and a relative humidity of 100%. For example, the article may exhibit a percent volume change of about 0 over a period of about 28 days and a temperature of about 200° F. at 0% relative humidity, or a percent volume change of about −1 over a period of about 28 days and a temperature of about 158° F. at 100% relative humidity.

The following examples, illustrating the articles of the present invention, are intended to illustrate and not to limit the invention.

EXAMPLES

The article of the present invention is made by combining a halogenated polyol, a brominated polyol, a flame retardant, and a supplemental polyol different from the brominated and halogenated polyols, a catalyst, a blowing agent, a surfactant, and optionally, an adhesion promoter in a vessel to form a resin composition. The resin composition and an isocyanate are then mixed together in a reaction vessel such as by spraying and react to form an article. The article is observed for cream time, gel time, tack-free time, and other properties. The amount and type of each component used to form the article is indicated in Table 1 below with all values in percent by weight based on the total weight of the resin composition unless otherwise indicated.

TABLE 1

| | Component | Article 1 | Article 2 | Article 3 | Article 4 |
|---|---|---|---|---|---|
| Resin Composition | Polyol A | 37.04 | 38.88 | 42.00 | 42.50 |
| | Polyol B | 9.92 | 10.42 | 0.00 | 9.92 |
| | Flame Retardant | 10.91 | 11.46 | 10.91 | 0.00 |
| | Polyol C | 15.21 | 15.97 | 20.17 | 20.66 |
| | Polyol D | 3.97 | 4.17 | 3.97 | 3.97 |
| | Catalyst A | 0.40 | 0.42 | 0.40 | 0.40 |
| | Catalyst B | 0.60 | 0.63 | 0.60 | 0.60 |
| | Catalyst C | 0.65 | 0.69 | 0.65 | 0.65 |
| | Blowing Agent A | 12.56 | 13.19 | 12.56 | 12.56 |
| | Blowing Agent B | 2.38 | 2.50 | 2.38 | 2.38 |
| | Additive A | 4.76 | 0 | 4.76 | 4.76 |
| | Additive B | 1.60 | 1.67 | 1.60 | 1.60 |
| | Total | 100.00 | 100.00 | 100.00 | 100.00 |
| Isocyanate | Ratio of Resin/Isocyanate | 0.96 | 1.01 | 0.96 | 0.91 |
| | Isocyanate Index | 110 | 110 | 110 | 110 |
| Results | Cream time, seconds | 13 | 13 | 12 | 15 |
| | Gel time, seconds | 87 | 87 | 85 | 89 |
| | Tack-free time, seconds | 137 | 137 | 132 | 141 |
| | Cure Temperature, ° F. | 73 | 73 | 73 | 73 |
| | Density of article, lbs/ft$^3$ | 2.1 | 2.1 | 2.1 | 2.1 |
| | E-84 Flame Spread Index* | 25 | 25 | 60 | 35 |
| | E-84 Smoke Density | 400 | 400 | 250 | 600 |
| | FM 4880 FSPc, seconds$^{-1/2}$ | 0.36 | 0.36 | 0.48 | 0.45 |

*This numerical flame spread rating is not intended to reflect hazards presented by this or any other material under actual fire conditions.

Polyol A is a halogenated aromatic polyester polyol having a nominal functionality of 2.4, and an OH value of from 300-325 mg KOH/g, commercially available from Oxid, Incorporated of Houston, Tex.

Polyol B is a tetrabromophthalate diol, commercially available from Great Lakes Chemical Corporation of West Lafayette, Ind.

Flame Retardant is trichloropropyl phosphate (TCPP), commercially available from Aceto Corp. of Lake Success, N.Y.

Polyol C is a sucrose/glycerine polyether polyol having a nominal functionality of 5.5, and an OH value of from 460-780 mg KOH/g, commercially available from BASF Corporation of Wyandotte, Mich.

Polyol D is a polyether tetrol having an OH value of from 540-570 mg KOH/g, commercially available from BASF Corporation of Wyandotte, Mich.

Catalyst A is 1,3,5-tris(3-(dimethylamino)propyl) hexahydro-s-triazine, commercially available from Air Products and Chemicals of Allentown, Pa.

Catalyst B is a tertiary amine catalyst, commercially available from Air Products and Chemicals of Allentown, Pa.

Catalyst C is N,N-dimorpholinodiethyl ether, commercially available from Chevron Products Company of San Ramon, Calif.

Blowing agent A is HFA 245fa, commercially available from Honeywell International Incorporated of Morristown, N.J.

Blowing agent B is water.

Additive A is propylene carbonate, commercially available from Huntsman Corporation of Salt Lake City, Utah.

Additive B is a polysiloxane-polyether copolymer surfactant, commercially available from Goldschmidt Chemical Corporation of Hopewell, VI.

Isocyanate is a polymeric diphenylmethane diisocyanate (MDI) having an actual functionality of about 3.0 and an NCO content of about 31.0%, commercially available from BASF Corporation of Wyandotte, Mich.

In Table 1 above, Articles 1 and 2 are examples of the present invention, and Articles 3 and 4 are comparative examples. The articles are made by combining the resin composition and the isocyanate. More specifically, the resin composition and the isocyanate are sprayed into a mold by a mix head. The articles rise, expand, and cure. The cream, gel, and tack-free times are measured. The densities of the articles are then measured. The articles are then removed from the mold. The time it takes to demold Article 1 and Article 2 is lower than in previous articles, and lower than Articles 3 and 4, which in turn increases production efficiency. Article 1 had the shortest demold time relative to the other articles. The articles are then tested for dimensionally stability. Article 1 and Article 2 are both deemed as having excellent dimensionally stability. The articles are then tested to determine if the flammability requirements are met. Article 1 and Article 2 have a flame spread index of 25 and a smoke density of 400 according to ASTM E-84 testing. In addition, Article 1 and Article 2 have a convective flame spread parameter ($FSP_c$) of $0.36s^{1/2}$ according to FM 4880 testing. These flammability results for Article 1 and Article 2 exceed the Class I flammability requirements. Conversely, comparative examples, Article 3 and Article 4, do not meet Class I flammability requirements. Both Article 3 and Article 4 exceed the FSP, upper limit of 0.39 seconds$^{-1/2}$ Article 3 and Article 4 also exceed the flame spread index upper limit of 25. Article 4 also exceeds the smoke density upper limit of 450.

Obviously, many modifications and variations of the present invention are possible in light of the above teachings. The invention may be practiced otherwise than as specifically described within the scope of the appended claims.

What is claimed is:

1. A urethane system for forming an article, said system comprising:
    an isocyanate; and
    a resin composition comprising
        a halogenated polyol,
        a brominated polyol different from said halogenated polyol,
        a sucrose/glycerine polyol different from both of said halogenated polyol and said brominated polyol, and
        a flame retardant.

2. A system as set forth in claim 1 wherein said brominated polyol is selected from the group of brominated diols, brominated triols, and combinations thereof.

3. A system as set forth in claim 2 wherein said brominated polyol is tetrabrominated.

4. A system as set forth in claim 2 wherein said brominated polyol is present in an amount of from 5 to 35 percent by weight based on the total weight of said resin composition.

5. A system as set forth in claim 1 wherein said halogenated polyol has a nominal functionality of less than 3.

6. A system as set forth in claim 5 wherein said halogenated polyol comprises one or more halogen substituents selected from the group of a chlorine atom, a bromine atom, and combinations thereof.

7. A system as set forth in claim 5 wherein said halogenated polyol comprises an aromatic polyester polyol.

8. A system as set forth in claim 5 wherein said halogenated polyol is present in an amount of from 20 to 85 percent by weight based on the total weight of said resin composition.

9. A system as set forth in claim 1 wherein said flame retardant is selected from the group of phosphates, phosphites, phosphonates, polyphosphates, polyphosphites, ammonium polyphosphates, and combinations thereof.

10. A system as set forth in claim 9 wherein said flame retardant is present in an amount of from 5 to 35 percent by weight based on the total weight of said resin composition.

11. A system as set forth in claim 1 further comprising a polyether tetrol different from said halogenated polyol, said brominated polyol, said sucrose/glycerine polyol.

12. A system as set forth in claim 1 wherein said sucrose/glycerine polyol has a nominal functionality of from 4 to 6.

13. A system as set forth in claim 1 wherein said sucrose/glycerine polyol is present in amount of from 2 to 25 percent by weight based on the total weight of said resin composition.

14. A system as set forth in claim 1 further comprising propylene carbonate as an adhesion promoter.

15. A system as set forth in claim 1 further comprising a hydrofluorocarbon as a blowing agent.

16. A system as set forth in claim 15 wherein said hydrofluorocarbon is present in an amount of from 10 to 25 percent by weight based on the total weight of said resin composition.

17. An article comprising the reaction product of a urethane system, said system comprising:
    an isocyanate; and
    a resin composition comprising
        a halogenated polyol,
        a brominated polyol different from said halogenated polyol, and
        a sucrose/glycerine polyol different from both of said halogenated polyol and said brominated polyol,
    in the presence of a flame retardant and a blowing agent.

18. An article as set forth in claim 17 wherein said brominated polyol is selected from the group of brominated diols, brominated triols, and combinations thereof.

19. An article as set forth in claim 18 wherein said brominated polyol is tetrabrominated.

20. An article as set forth in claim 17 wherein said halogenated polyol has a nominal functionality of less than 3.

21. An article as set forth in claim 20 wherein said halogenated polyol has one or more halogen substituents selected from the group of a chlorine atom, a bromine atom, and combinations thereof.

22. An article as set forth in claim 20 wherein said halogenated polyol comprises an aromatic polyester polyol.

23. An article as set forth in claim 17 wherein said flame retardant is selected from the group of phosphates, phosphites, phosphonates, polyphosphates, polyphosphites, ammonium polyphosphates, and combinations thereof.

24. An article as set forth in claim 17 comprising the further reaction product of said isocyanate, said halogenated polyol, said brominated polyol, said sucrose/glycerine polyol, and a polyether tetrol different from said halogenated polyol, said brominated polyol, and said sucrose/glycerine polyol, in the presence of said flame retardant and said blowing agent.

25. An article as set forth in claim 17 wherein said sucrose/glycerine polyol has a nominal functionality of from 4 to 6.

26. An article as set forth in claim 17 formed in the presence of propylene carbonate as an adhesion promoter.

27. An article as set forth in claim 17 wherein said isocyanate and said resin composition are reacted at an isocyanate index of from 90 to 150.

28. An article as set forth in claim 17 wherein said blowing agent comprises a hydrofluorocarbon.

29. An article as set forth in claim 17 having a flame spread index of less than or equal to 25 and a smoke density of less than or equal to 450 according to ASTM E-84 testing.

30. An article as set forth in claim 29 having a convective flame spread parameter of less than or equal to $0.39\ s^{-1/2}$ according to FM 4880 testing.

31. An article as set forth in claim 17 having a density of from 1.0 to 3.0 pounds per cubic foot.

32. An article as set forth in claim 17 having a gel time of from 60 to 120 seconds.

33. A system as set forth in claim 1 wherein said brominated polyol is present in an amount of from 5 to 35 percent by weight, said halogenated polyol is present in an amount of from 20 to 85 percent by weight, said sucrose/glycerine polyol is present in amount of from 2 to 25 percent by weight, and said flame retardant is present in an amount of from 5 to 35 percent by weight, each based on the total weight of said resin composition.

34. An article as set forth in claim 17 wherein said sucrose/glycerine polyol is present in amount of from 2 to 25 percent by weight based on the total weight of said resin composition.

35. An article as set forth in claim 17 wherein said brominated polyol is present in an amount of from 5 to 35 percent by weight, said halogenated polyol is present in an amount of from 20 to 85 percent by weight, said sucrose/glycerine polyol is present in amount of from 2 to 25 percent by weight, and said flame retardant is present in an amount of from 5 to 35 percent by weight, each based on the total weight of said resin composition.

36. An article as set forth in claim 17 wherein said isocyanate and said resin composition are reacted at an isocyanate index of at least 105.

* * * * *